March 21, 1933.    T. A. KIRTON    1,902,454
SELF LOCKING BOLT
Filed May 21, 1931
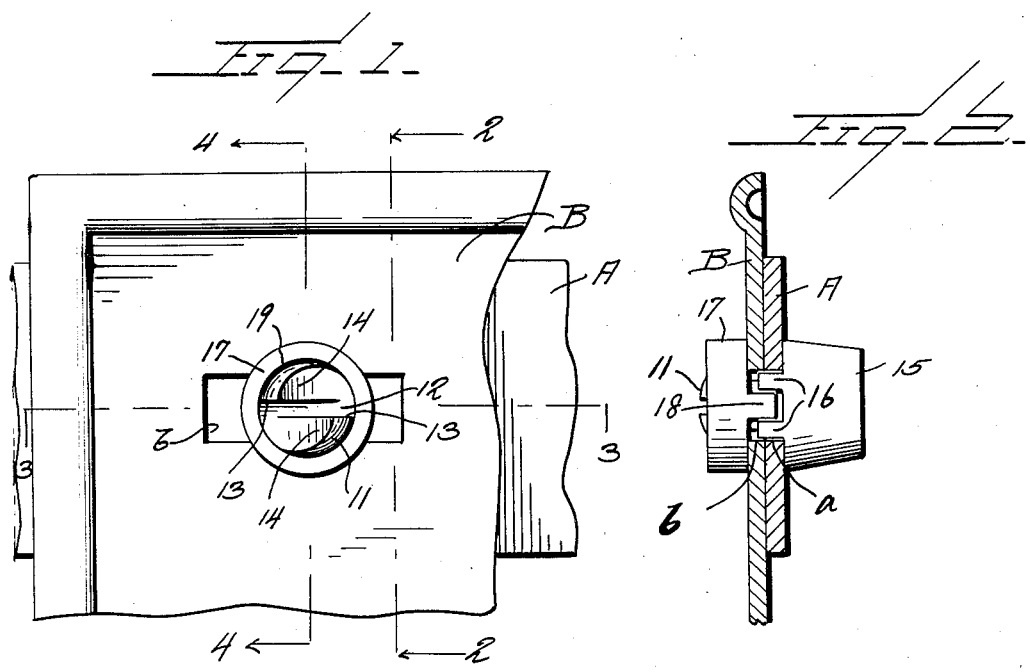
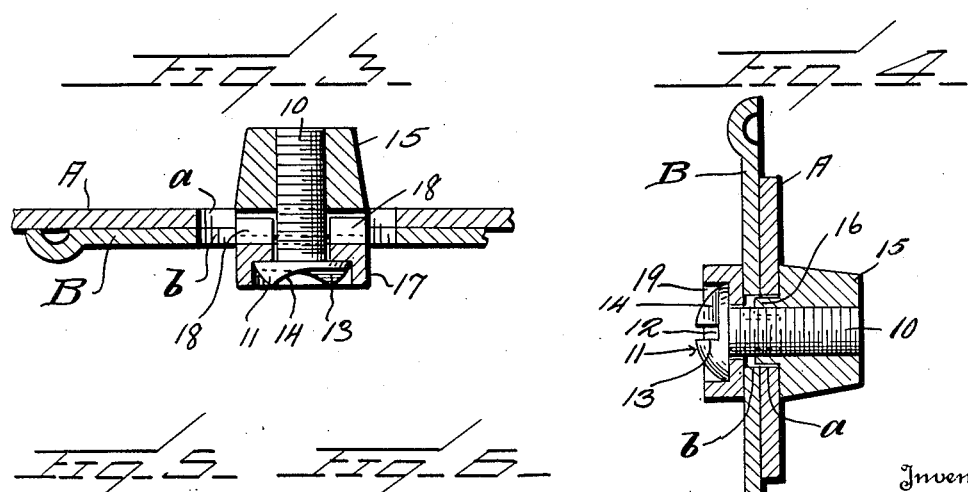
Inventor
T. A. Kirton
By Watson E. Coleman
Attorney Patented Mar. 21, 1933

1,902,454

UNITED STATES PATENT OFFICE

THOMAS A. KIRTON, OF JACKSONVILLE, FLORIDA, ASSIGNOR TO LANIER-KIRTON CO. INC., OF JACKSONVILLE, FLORIDA, A CORPORATION OF FLORIDA

SELF-LOCKING BOLT

Application filed May 21, 1931. Serial No. 539,100.

This invention relates to attaching means and particularly to bolts adapted to be used for holding automobile license plates in engagement with supports for the same and the object of the invention is to provide a bolt so constructed that when the nut has been screwed home and the plates held in engagement with each other, the nut cannot be removed nor the bolt detached unless the license plate, for instance, is hacked or torn away or unless the bolt is cut off.

A further object is to provide a construction of this character embodying a bolt, a nut therefor, and a washer, the washer and nut being so formed that when the bolt is screwed home the nut and washer will be brought into interlocking engagement with slots in the supporting plate and the license plate or tag to thus prevent any rotation of the nut or washer, the washer being further so formed as to surround the head of the bolt when the nut is screwed home, the head of the bolt being so formed that it cannot be screwed out from the nut by the application of a screw driver or like implement.

Other objects will appear in the course of the following description.

My invention is illustrated in the accompanying drawing, wherein:—

Figure 1 is a front elevation of the device in applied position;

Figure 2 is a section on the line 2—2 of Figure 1;

Figure 3 is a section on the line 3—3 of Figure 1;

Figure 4 is a section on the line 4—4 of Figure 1;

Figures 5 and 6 are face views of the nut and washer showing the interlocking lugs.

Referring to the drawing. A designates a supporting plate or rack as it may be termed and B a license plate or tag. The elements A and B are provided with slots $a$ and $b$ which are adapted to be placed in coincidence with each other. The screw 10 is provided with a head 11, which head is formed to provide what I may term a ratchet nick, that is, a nick so formed that a screwdriver may be engaged with the nick to turn the screw in one direction, but will be automatically ejected from the nick or prevented from holding upon a rotation of the screwdriver in the opposite direction. To this end, the nick 12 is defined by diagonally opposed shoulders 13, the upper faces of which extend down on an incline as at 14 to the bottom of the nick. Engageable with the shank of the screw 10 is the nut 15 which is interiorly screw-threaded and preferably somewhat conical and one end face of this nut is formed with two lugs or teeth 16 which extend parallel to each other on each side of the screw-threaded aperture of the nut and diametrically with relation to the nut.

Coacting with the screw and nut is a washer 17 which has a central perforation as usual to loosely receive the screw 10 and which is provided upon one face with the two teeth or lugs 18 disposed in diametric relation and adapted to be inserted between or interdigitate with the lugs 16 on the nut 15.

The opposite or outside face of the nut is recessed at 19, the recess being of sufficient internal diameter to entirely receive the head 11 of the screw.

The parts described are disposed as illustrated in Figure 1, the lugs or teeth 16 of the nut 15 extending through the supporting plate or rack A and if necessary through the slot in plate B also while the lugs on the washer also extend through the slot $b$ and into engagement between the teeth or lugs 16 on the nut 15. When the screw is turned entirely home, the head 11 will be disposed entirely within the recess 19. Under these circumstances, it is obvious that a screwdriver cannot be applied successfully to the head 11 to cause a reverse rotation of the head 11 because this screwdriver will be ejected as it were from the nick 12 by the inclined portions 14. Inasmuch as the head 11 is disposed entirely within the recess 19, it is impossible to grip the head 11 by means of pliers, or otherwise, to cause a reverse rotation of the screw.

A rotation of the washer is rendered impossible by the engagement of the teeth 18 through the slot $b$ of the plate B and a reverse rotation of the nut 15 is rendered impossible by the engagement of the lugs or teeth 16 with the walls of the slot $a$. If the slot $b$ has a width greater than the width of the teeth 18, and if the thickness of the plates A and B is such that the teeth 18 do not engage the teeth 16, then the washer might be turned to a slight degree but this would not affect the bolt nor the nut thereon. If the supporting rack A is of the usual thickness and the element B, which, as before remarked, may be a sheet metal license tag, is of the usual thickness, the lug 18 will extend slightly into the space between the lugs or teeth 16.

If, however, the rack or supporting plate A be of greater thickness than usually found on small cars, the teeth 18 will not engage with the teeth 16 but, as before remarked, the washer is incapable of rotation because of the teeth 18 engaging the slot b. It is impossible, therefore, by using pliers and clamping down upon the outer portion of the washer to jam it on the bolt and thus cause a rotation of the bolt because, under any circumstances, the washer is locked from rotation. If it be desired to remove the license tag or other element B, it must be cut or torn away as, for instance, by pliers and the pieces removed from between the carrier rack A and the washer. Then the washer may be moved forward sufficiently to uncover the head end of the bolt and permit the bolt to be reversely turned. Of course, this requires the destroying of the license tag.

While I have particularly designed this bolt for use in holding license tags in place, the license tags being of the character shown in my pending application for patent, Serial No. 531,814, I do not wish to be limited to this, as obviously the bolt may be used with other forms of license tag or with other elements A and B within a support or carrier rack and a license tag.

Furthermore, while I have illustrated the nut 15 as being provided with two teeth 16 and the washer 17 as being provided with teeth or lugs disposed in line to engage between the teeth or lugs 17, it is obvious that the pair of teeth or lugs 16 may be disposed on the washer and the nut 15 provided with the teeth 17. It is sufficient that the nut and washer have interdigitating teeth on their confronting surfaces or are provided with lugs or teeth which will fit within the slots formed in the members A and B.

While I prefer to use teeth or lugs 16 and 18 which are rectangular in cross section, these lugs might be V-shaped in cross section.

I claim:—

1. The combination with two elements, each having a slot, of a bolt passing through the slots and having a ratchet nick in its head, a nut engaging the bolt and a washer through which the bolt passes, the confronting faces of the washer and nut having diametrically extending projecting portions extending into the slots in the said elements to thus prevent any rotation of the nut or washer when the nut is screwed home, the outer face of the washer being recessed to receive the head of the screw and surround its periphery.

2. The combination with two elements, each having a slot, of a bolt passing through the slots and having a ratchet nick in its head, a nut engaging the screw, and a washer through which the screw passes, the confronting faces of the washer and nut having diametrically extending interdigitating teeth having parallel opposed faces, the teeth projecting through the slots in the elements, the outer face of the washer being recessed to receive the head of the screw and enclose its periphery.

3. The combination with two elements, each having a slot, of a bolt passing through the slot and having a ratchet nick in its head, a nut engaging the screw and a washer through which the screw passes, the confronting faces of the washer and nut having diametrically extending parallel interdigitating teeth extending into the slots in the elements and parallel to the longitudinal walls of the slot, the walls of said slots by their engagement with the teeth preventing rotation of either the nut or the washer, the outer face of the washer being recessed to receive the head of the screw.

4. The combination with two elements, each having a slot, of a bolt passing through the slot and having a ratchet nick in its head, a nut engaging the bolt, a washer loosely surrounding the bolt between the head and the nut, the confronting faces of the washer and nut having one a pair of transversely extending teeth and the other a single diametrically extending tooth adapted to be received between the first named pair of teeth, the slot in one of said elements having a width just sufficient to receive a pair of teeth, the outer face of the washer being recessed to receive the head of the screw and enclose its periphery.

5. The combination with two elements, each provided with a slot, of a bolt passing through the slots and having a ratchet nick in its head, a nut engaging the bolt and a washer through which the bolt passes and having a recess to receive the head of the bolt, the confronting faces of the washer and nut having diametrically extending lugs adapted to be received within the slot of the bracket and having a width such that neither the washer nor the nut can be turned within the walls of the slot when the bolt is screwed home.

6. An attaching means of the character described comprising a bolt having a ratchet nick in its head, a nut member engaging the bolt, and a washer member through which the bolt passes, the face of one of these members confronting the other member having a pair of parallel teeth extending transversely across the face of the member on each side of its central aperture, the outer faces of the teeth being spaced from the adjacent portions of the perimeter of the member, the other member having a diametrically extending tooth on its face adapted to be received between the teeth on the first named member.

In testimony whereof I hereunto affix my signature.

THOMAS A. KIRTON.